Patented Dec. 11, 1945

2,390,931

UNITED STATES PATENT OFFICE 2,390,931

WELL LOGGING METHOD

Robert Earl Fearon, Tulsa, Okla., assignor to Well Surveys, Incorporated, Tulsa, Okla., a corporation of Delaware No Drawing. Application January 6, 1941,
Serial No. 373,379

6 Claims. (Cl. 250—83.6)

This invention relates generally to methods of geophysical exploration and more especially is concerned with a novel method of well-logging which provides a new parameter believed to be related to the porosity and perhaps other physical characteristics of subterranean strata.

In view of the importance of subterranean deposits, particularly oil and gas, and because of the known relations existing between the characteristics of subsurface rock formations and the presence of these valuable deposits, many methods of exploration have been developed whereby the nature of the rock and other geological formations in the earth's crust at various levels can be determined by means of apparatus moved within a well bore. Each of these methods of exploration is based upon measurement of one or more characteristics of the formations which, when related to depth and compared for a plurality of wells in a field gives an indication of the nature and shape of the subsurface formations.

Some of the methods are based upon a determination of the specific electrical resistance of subterranean strata but these methods of exploration are disadvantageous in that electrical resistance is materially altered by the presence of salt water, thus vitiating the observations made in ordinary types of well bores because of the impossibility of distinguishing, upon the basis of resistance alone, between substances having widely different geological natures such as shale and limestone which, although they could be distinguished when dry by specific resistance alone, absorb various quantities of salt water thus altering their resistances and masking their true nature. Other present day methods of geophysical exploration are based upon the modification of subterranean electromagnetic fields by the deposits of materials having high electromagnetic reluctance. These methods, although often useful in charting wholly unexplored fields, are disadvantageous in that subterranean electromagnetic fields can be seriously and unpredictably disturbed not only by subsurface ore deposits but also by the presence in the vicinity, either above or below the earth's surface of charged electrical conductors such as power lines, masses of iron, for example well casings or pipes and the like.

Recently, however, a new method of geophysical prospecting has been developed, based upon the discovery that substantially all substances, particularly naturally occurring substances, exhibit measurable degrees of radioactivity, manifested by the discharge of various intensities and frequencies of gamma rays. This radioactivity of natural rocks is believed due to the wide distribution of radium or other radioactive substances not only in igneous but also in sedimentary rocks. It permits accurate logging of a well bore by measuring the radioactivity of surrounding rock formations at various depths within the well bore. This method of well-logging is much more satisfactory than any heretofore known method because it permits, in many instances, the determination, sharply and with accuracy, of the interfaces between subterranean strata. This is due to the wide variation in the radioactivity of individual varieties of both igneous and sedimentary rocks. For example, to illustrate the wide variation in radioactivity among different species of rocks, granite possesses a radioactivity corresponding to the presence of $4.0 \times 10^{-12}$ grams of radium per gram of rock, basalt possesses radioactivity corresponding to the presence of $.5 \times 10^{-12}$ grams of radium per gram of rock.

As is evident from the above figures the degree of natural radioactivity of rocks is quite low and instruments of extreme sensitivity are essential if it is to be measured but these difficulties have been overcome and methods of well-logging based on radioactivity measurements are now commercially practiced. Such methods are especially useful in the logging of cased wells which is not possible with other methods of well-logging.

The present invention relates to a further advance in well-logging of this general type differing in that the measurements no longer depend upon the natural radioactivity of the surrounding strata and further in that the measurements give a somewhat different indication of the nature of the surrounding strata.

Regarded in certain of its broader aspects, the novel process of well-logging pursuant to the present invention comprises treating the well bore with a material, which can be a liquid, a gas, or a divided solid, having radioactive qualities, in such a manner that the said material can be retained within the well bore as for instance by absorption in varying degree by different subterranean strata depending upon the porosity or other characteristics thereof. Thereafter the relative quantities and locations of the retained radioactive material may be measured by radioactivity well-logging methods of any desired type.

The present method of well-logging provides a practical and economical method for determining a new parameter which is probably an accurate indication of the absolute porosity of the material under observation. This provides the geologist with information which could not be obtained by prior art methods.

Measurements related to porosity which are made by determining the natural potential induced in the drill hole by means of electroosmosis, and electrofiltration are subject to considerable discrepancies, and do not provide a clear determination of the porosity. Such discrepancies arise from the occurrence of undesired effects, in the measuring circuit, which undesired effects cannot be distinguished from the potential which corresponds with porosity. Undesired effects which merit attention are:

1. Those due to polarization of the electrodes;
2. Those due to electrochemical potential differences induced at the interface between the formation and the drilling fluid, such electrochemical potential being particularly noticeable in case the adjacent rock is dolomitic;
3. Disturbances due to the presence of excessive or varying concentrations of salt in the drilling fluid.

Besides the above disturbing factors, others enter and introduce a trend into the results, which, although not destroying the possibility of comparison between adjacent sands, renders the measurement valueless for determining any data of a strictly quantitative nature regarding the porosity. These trends are of the following kinds:

1. A trend due to the gradual change of the difference of hydraulic pressure between the drill hole and the fluid contained in the adjacent formations. This difference of pressure commonly varies slowly and continuously from the top of the hole to the maximum depth reached.
2. A trend due to the continuous variation of salinity of the fluid contained in the adjacent formations. Ordinarily water contained in pervious layers situated at shallow levels is less saline than that contained in pervious layers situated at very great depths, and there is some sort of a smooth progression in the intervening layers. Of course erratic changes may occur, in which case the interpretation of the natural potential becomes even more difficult.

From this it will be seen that methods of the prior art, although they present a measurement which bears some relation to the porous nature of the material under observation, do not offer a clear means of determining definitely and quantitatively the amount of pore space.

The geophysical exploration process according to this invention is not only advantageous in that it can be made to provide a parameter which appears to be a direct indication of porosity but it is also characterized by the advantage that it permits treatment of a well during drilling or at least prior to casing in a manner such that the porosity of traversed strata may be accurately measured after the drilling operations have been completed and the well has been cased, a procedure which could not be achieved by the practice of any prior art process of porosity measurements known to the present inventor.

Another advantage of the geophysical exploration process according to the instant invention is that the parameter obtained in the practice thereof is based upon artificial as distinguished from natural radioactivity, caused by the introduction of foreign radioactive material into the well bore. In accordance with this invention, the material so introduced can be a naturally radioactive substance or can be a material of a nature such as not to permanently preclude well-logging based on measurements of natural radioactivity as referred to above. Among the naturally radioactive materials which are suited for use as above mentioned are ores containing radium, uranium, thorium and actinium such as pitchblende, uraninite, thorite, thorianite, carnotite, monazite, and the like. When employed in the practice of this invention, these materials are preferably used as solutions or in finely divided form to facilitate distribution of the same within the well bore and into surrounding strata. Artificially radioactive substances suitable for use in practicing this invention will hereinafter be described.

Other advantages of the novel well-logging process according to the present invention will be apparent to those skilled in this art upon study of the following disclosure.

While, as has been above mentioned, naturally radioactive substances can be employed in the practice of the present invention, it is preferred to use materials having artificially induced radioactivity. In the latter instance, a material, preferably water-soluble, having temporary, as distinguished from substantially permanent, radioactive qualities is introduced into the well bore. This may be done, for example, by adding the material to the mud used for lubricating the bit during drilling operations. Detectable quantities of the radioactive material are retained, probably absorbed, by the subterranean strata to a degree believed to be proportionally related to the porosity of the strata. Thereafter the relative quantities of retained or absorbed material may be measured by known radioactivity well-logging methods.

As has been mentioned, it is not essential in the practice of this process that the well-logging operations be performed before the well is cased because the material, retained by absorption or otherwise, will remain within the subterranean formations through which the well bore passes and can subsequently be detected through the casing, which, being made of iron or steel, is relatively transparent to gamma-rays. The logging of the well can be performed by moving, within a well bore, a radiation sensitive device such as a Geiger-Müller counter or a high pressure ionization chamber associated with appropriate amplifying and signal transmitting means, receiving the signal produced by said means, and recording the received signal in correlation with indications of depth.

In the types of radioactivity well-logging methods now commonly in use, the ionization chamber or Geiger-Müller counter yields, through the amplifier, a residual or background signal resulting from the impact of cosmic rays or the like upon the sensing device. This signal appears continuously irrespective of the presence of radioactive material in the vicinity of the sensing means. Superposed upon this background signal but materially different in magnitude therefrom is the signal produced by the natural radioactivity of subsurface strata, this being the signal which is utilized in present day radioactivity well-logging methods for the charting of the subterranean formations. When practicing the present invention, it is preferred that the additional signal be of a third order of magnitude when superposed upon these above mentioned signals and impressed upon the sensing device. This signal of a new order of magnitude can be produced preferably by the presence of substantially more than just merely appreciable quantities of radioactive material within the well bore, that is, the addition of the foreign material into the uncased well bore is made in quantities such that the magnitude of this last mentioned signal has a minimum value substantially exceeding the maximum value both of the residual or background signal and of the signal produced solely by natural radioactivity of the traversed subterranean strata. In other words, the parameter derived in the practice of the present process of well-logging is preferably the result, for all practical purposes, solely of the presence of extraneous or foreign radioactive masses within the well bore and not materially of the natural activity of the surrounding formations.

As has been mentioned above, it is desirable on many occasions to supplement the log obtained by the practice of this invention with additional information obtainable by practicing other methods of well-logging, for instance, those methods which are based upon studies of natural radioactivity. Upon these occasions, it is of course important that the foreign radioactive material introduced into the well bore be of a nature such as not to mask indefinitely the natural radioactivity of the traversed subterranean strata. To that end the foreign or extraneous radioactive material will preferably have a short radioactive life thus permitting the measurement of natural radioactivity after expiration of a time period of corresponding duration.

It has been found that this desired effect can be achieved by using, as the foreign radioactive material, an activated alkali metal salt or other activated metal containing compound such as activated salts of sodium, potassium, rubidium or the like. These materials are preferable, because of their low cost, to naturally radioactive materials such as salts and other derivatives of radium, uranium and thorium, and are also more satisfactory for the purposes of this invention because their radioactive life in most instances is of much shorter duration. Experience indicates that among the above mentioned substances the most satisfactory materials for the purposes of this invention are salts of sodium activated by exposure to alpha rays. The activation of sodium salts or other compounds, which normally exhibit only negligible radioactivity, can be accomplished by exposing the material to be activated to α radiation, that is streams of α particles (positively charged helium nuclei) obtained from a suitable source. Among sources which are suitable are naturally radioactive substances such as uranium, radium, thorium or equivalents thereof. If, because of cost of naturally radioactive materials or for other reasons the use of an artificial source of α rays is preferable, suitable high voltage tubes emitting radiation of the desired wave length can be employed with advantage. Because of the relatively short effective range of α radiation, the material to be activated should be placed in close proximity to the source of radiation and distributed in thin layers with suitable agitation during treatment to assure thorough exposure of the entire mass. The activated material thereafter emits γ rays of high penetrating power and intensity for a period which can be as long as two years, depending upon the activation treatment. By this method it is possible to produce a soluble foreign substance of high radioactivity which, when introduced into the well drilling liquid, can be absorbed or otherwise retained by the subterranean strata.

The well log obtained by practice of this process is of especial value because it permits accurate and easy detection of subterranean strata interfaces due to the rapid change in the parameter ascribable it is believed, to widely different porosities, and hence absorptive qualities, of the rock of the various strata.

In some instances, because of cost or for other reasons, it is undesirable to introduce large quantitiees of radio-active material into the well bore to produce a signal of a magnitude materially exceeding the signal arising from the natural radioactivity of formations encountered by the bore. On these occasions, differentiation between the signals produced by natural and introduced materials can be accomplished by obtaining a natural radioactivity log of the well prior to the introduction of the radioactive substance, and comparing this log with the log subsequently obtained after the radioactive material has been introduced. It will be evident that the differences in the logs will represent the signals due to the radioactivity of introduced material.

It will be apparent to those skilled in this art that the principles of the hereinabove described process are capable of variations to suit both the exigencies of the situation or the wishes of those practicing the process. The principles of the invention may be applied to the location or measurement of any radioactive material introduced into a well bore or the structure surrounding it for any purpose. All forms of radioactive material and all methods of introducing it are contemplated as within the broad scope of this invention.

As a further example of how the principles of this invention may be applied to problems encountered in well logging, the radioactive material introduced into the well bore may be of a nature such as to cause emission of radiation of a different type from surrounding geological formations which can be measured as an indication of the character of the formation. In this manner, radioactive material introduced into subsurface strata can cause emission of streams of neutrons the intensity of which can be measured by an instrument not responsive to radiations from the radioactive material employed, thus affording further data relative to the strata for use in determining its geological nature.

It is to be understood that the substitution of equivalent materials and modifications of the process according to this invention other than those above mentioned which would be apparent to those skilled in this art are comprehended within the scope of the invention and of the subjoined claims.

I claim:

1. Method of geophysical exploration which comprises dissolving in the well drilling liquid a compound of sodium possessing artificial radioactivity produced by activation with alpha rays, whereby quantities of the dissolved material are retained by subsurface strata traversed by the well, removing the said liquid not thus retained, and subsequentlly logging the well to obtain measurements of subterranean radioactivity correlated with measurements of depth.

2. Method of preparing an uncased well bore for radioactivity logging which includes the steps of flushing the well bore with a liquid having dissolved therein a sodium compound possessing temporary radioactive qualities induced by treatment with alpha-rays, whereby said liquid and dissolved material are retained by subterranean strata; removing the said liquid not thus retained; and subsequently logging the well to obtain measurements of the relative quantities of retained material and their locations.

3. Method of geophysical exploration which comprises including in the well drilling liquid a compound of sodium possessing artificial radioactivity produced by activation with alpha rays, whereby quantities of included material are retained by subsurface strata traversed by the well, removing the said liquid and included material not thus retained, and subsequently logging the well to obtain measurements of subterranean radioactivity correlated with measurements of depth.

4. Method of preparing an uncased well bore for radioactivity logging which includes the steps of flushing the well bore with a liquid having included therein a sodium compound possessing temporary radioactive qualities induced by treatment with alpha rays, whereby said liquid and included material are retained by subterranean strata; removing the said liquid and included material not thus retained; and subsequently logging the well to obtain measurements of the relative quantities of retained material and their locations.

5. Method of geophysical exploration which comprises including in the well drilling liquid a compound possessing artificial radioactivity produced by activation with alpha rays and having a half life not exceeding one day, whereby quantities of the included material are retained by subsurface strata traversed by the well, removing the said liquid and included material not thus retained, and subsequently logging the well to obtain measurements of subterranean radioactivity correlated with measurements of depth.

6. Method of preparing an uncased well bore for radioactivity logging which includes the steps of flushing the well bore with a liquid having included therein a compound possessing temporary radioactive qualities induced by treatment with alpha rays and having a half life not exceeding one day, whereby said liquid and included material are retained by subterranean strata; removing the said liquid and included material not thus retained; and subsequently logging the well to obtain measurements of the relative quantities of retained material and their locations.

ROBERT EARL FEARON.